US010360894B1

(12) United States Patent
Rakshit et al.

(10) Patent No.: US 10,360,894 B1
(45) Date of Patent: Jul. 23, 2019

(54) DIRECTION-AWARE CROSS TALK MANAGEMENT

(71) Applicant: INTERNATIONAL BUSINESS MACHINES CORPORATION, Armonk, NY (US)

(72) Inventors: Sarbajit K. Rakshit, Kolkata (IN); John M. Ganci, Jr., Raleigh, NC (US); Martin G. Keen, Cary, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,670

(22) Filed: Nov. 28, 2018

(51) Int. Cl.
| G10K 11/178 | (2006.01) |
| G06K 9/00 | (2006.01) |
| G06F 3/16 | (2006.01) |
| G06F 3/01 | (2006.01) |
| G10L 17/00 | (2013.01) |

(52) U.S. Cl.
CPC ........ G10K 11/17823 (2018.01); G06F 3/013 (2013.01); G06F 3/165 (2013.01); G06K 9/00288 (2013.01); G10L 17/005 (2013.01); G10K 2210/1081 (2013.01)

(58) Field of Classification Search
CPC ...... G10K 11/17823; G10K 2210/1081; G10L 17/005; G06K 9/00288; G06F 3/165; G06F 3/013
See application file for complete search history.

(56) References Cited

U.S. PATENT DOCUMENTS

| 8,170,193 B2 | 5/2012 | Curry et al. |
| 8,995,688 B1 | 3/2015 | Chemtob et al. |
| 2012/0120218 A1 | 5/2012 | Flaks et al. |
| 2014/0270200 A1* | 9/2014 | Usher .................. H04R 1/1041 381/57 |

(Continued)

FOREIGN PATENT DOCUMENTS

| EP | 2569940 A1 | 3/2013 |
| WO | 2015050745 A1 | 4/2015 |

OTHER PUBLICATIONS

Quora, Is there a noise cancelling headphone that can cancel human voice?, last updated 2017, entire document, https://www.quora.com/Is-there-a-noise-cancelling-headphone-that-can-cancel-human-voice.

(Continued)

*Primary Examiner* — Ping Lee
(74) *Attorney, Agent, or Firm* — Patrick J. Daugherty; Daugherty & Del Zoppo Co., LPA

(57) ABSTRACT

In response to commencement of a meeting, embodiments select audio signals provided by the host of a meeting as a primary audio data source broadcast to a first meeting participant through a speaker of headphones worn by the first participant; determine a direction of gaze of the first meeting participant as a function of orientation data of the headphones; in response to determining that a second meeting participant is located within the gaze and that attention of the first participant is focused upon the second participant, initiate a side conversation between the first and second participants and set audio signals provided by the second participant as the primary source to the first participant through the headphones speaker.

20 Claims, 5 Drawing Sheets

(56) References Cited

U.S. PATENT DOCUMENTS

2016/0309252 A1    10/2016   Geiger et al.
2017/0351476 A1    12/2017   Yoakum et al.

OTHER PUBLICATIONS

Peter Mell et al, The NIST Definition of Cloud Computing, National Institute of Standards and Technology, Publication 800-145, 2011, entire document.

* cited by examiner

DIRECTION-AWARE CROSS TALK MANAGEMENT

BACKGROUND

Meetings formats for multiple participants include in-person meetings within a conference room or other common physical space, and audio and video conferences wherein some participants may participate from other, remote locations. Side conversations that occur during a meeting between different participants may generate cross-talk speech or audio and video signals that are audible to other meeting participants, and thereby compete with or interfere with messages conveyed by a primary speaker to other meeting participants in some meeting environments, making it difficult for participants to pay attention to or hear the primary speaker.

BRIEF DESCRIPTION OF THE DRAWINGS

These and other features of embodiments of the present invention will be more readily understood from the following detailed description of the various aspects of the invention taken in conjunction with the accompanying drawings in which.

BRIEF SUMMARY

Figure 1:
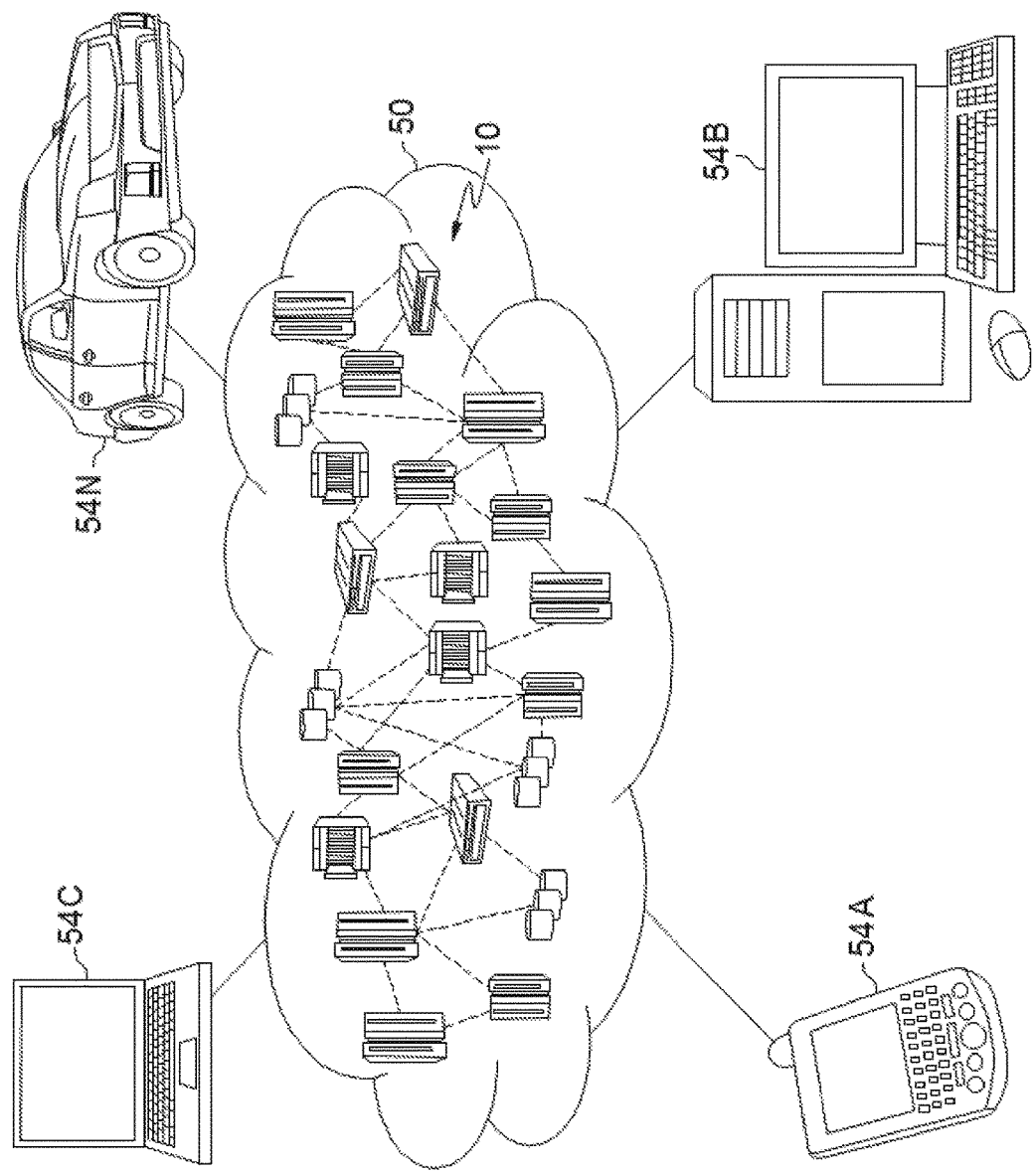
FIG. 1 depicts a cloud computing environment according to an embodiment of the present invention.

In one aspect of the present invention, a computer-implemented method includes, in response to commencement of a meeting, selecting audio signals provided by host of the meeting as a primary source of audio data broadcast to a first participant of the meeting through a speaker of a first set of participant headphones that are worn by the first participant; determining a direction of gaze of the first meeting participant as a function of orientation data of the first participant headphones; initiating a side conversation between the first participant and a second participant of the meeting in response to determining that the second participant is located within the determined direction of gaze of the first participant and that attention of the first participant is focused upon the second participant; and, in response to initiating the side conversation, setting audio signals provided by the second participant of the meeting as the primary source of audio data broadcast to the first participant through the speaker of the first set of participant headphones.

In another aspect, a system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby, in response to commencement of a meeting, selects audio signals provided by host of the meeting as a primary source of audio data broadcast to a first participant of the meeting through a speaker of a first set of participant headphones that are worn by the first participant; determines a direction of gaze of the first meeting participant as a function of orientation data of the first participant headphones; initiates a side conversation between the first participant and a second participant of the meeting in response to determining that the second participant is located within the determined direction of gaze of the first participant and that attention of the first participant is focused upon the second participant; and, in response to initiating the side conversation, sets audio signals provided by the second participant of the meeting as the primary source of audio data broadcast to the first participant through the speaker of the first set of participant headphones.

In another aspect, a computer program product for pairing discrete groupings of meeting participants as a function of directional orientation and gaze focus data has a computer-readable storage medium with computer readable program code embodied therewith. The computer readable program code includes instructions for execution by a computer processor that cause the first computer processor to, in response to commencement of a meeting, select audio signals provided by host of the meeting as a primary source of audio data broadcast to a first participant of the meeting through a speaker of a first set of participant headphones that are worn by the first participant; determine a direction of gaze of the first meeting participant as a function of orientation data of the first participant headphones; initiate a side conversation between the first participant and a second participant of the meeting in response to determining that the second participant is located within the determined direction of gaze of the first participant and that attention of the first participant is focused upon the second participant; and, in response to initiating the side conversation, set audio signals provided by the second participant of the meeting as the primary source of audio data broadcast to the first participant through the speaker of the first set of participant headphones.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
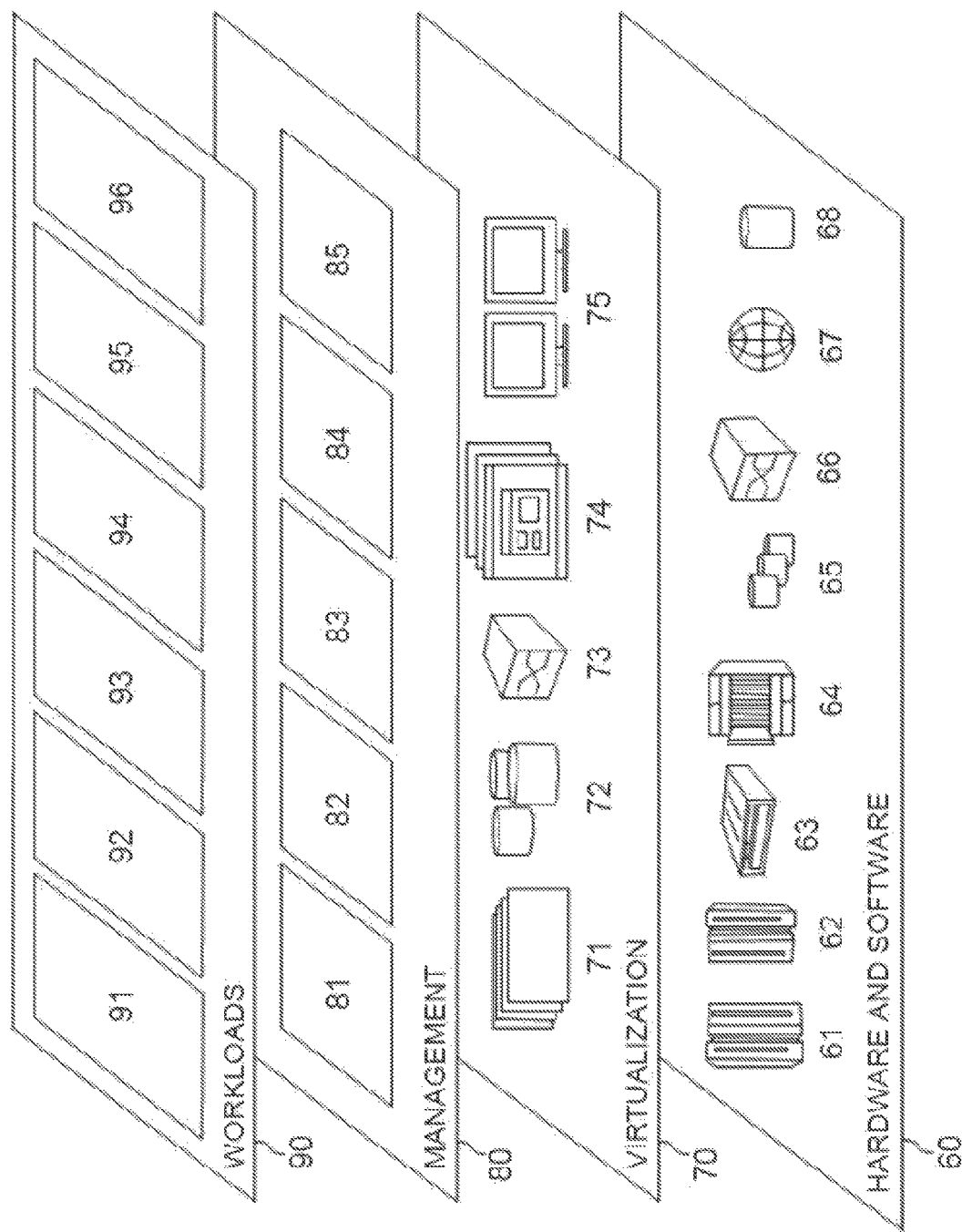
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for pairing discrete groupings of meeting participants as a function of directional orientation and gaze focus data according to aspects of the present invention 96.

Figure 3:
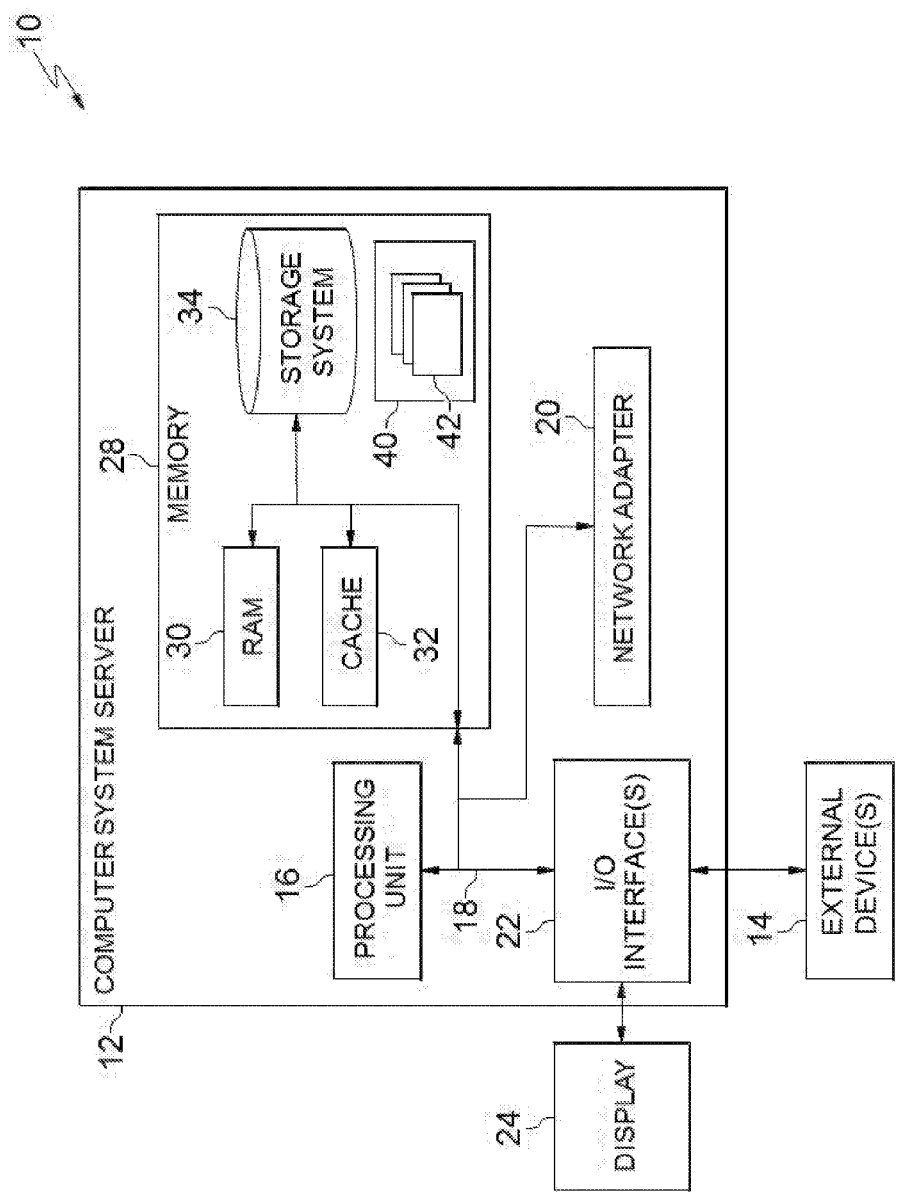
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
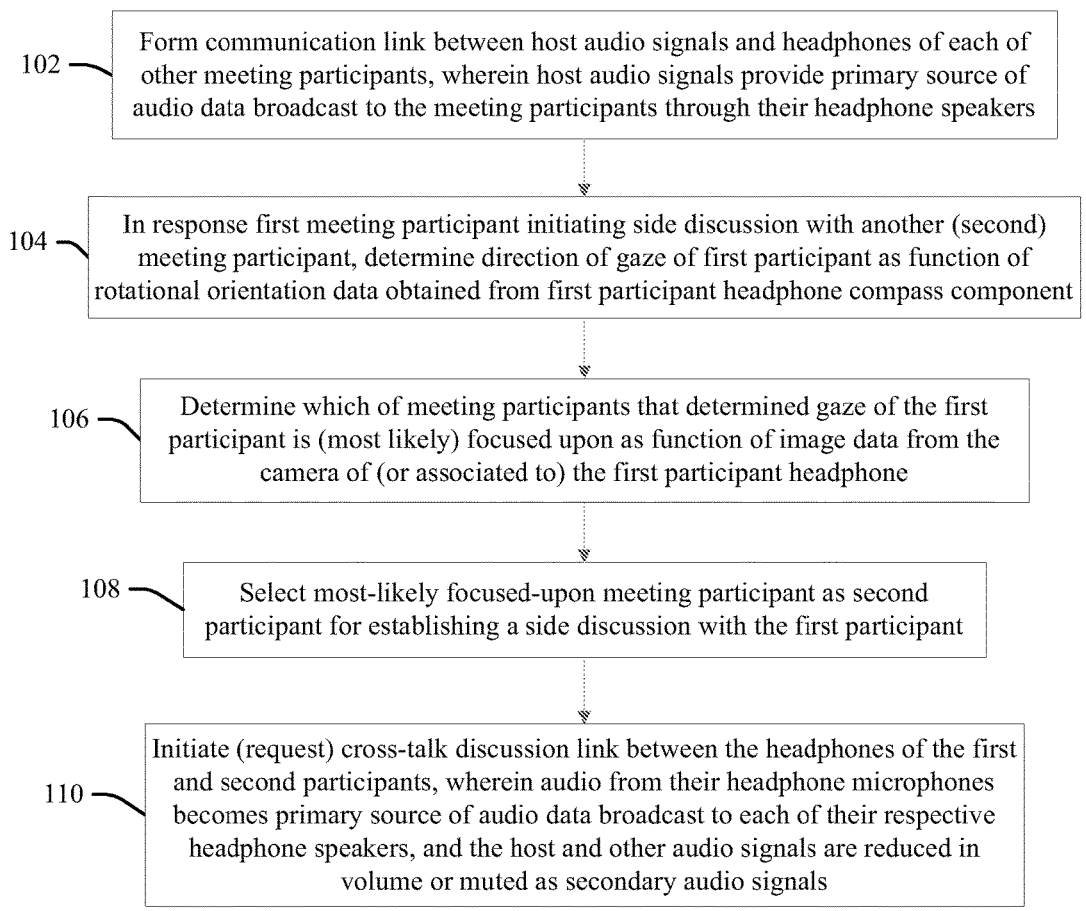
FIG. 4 is a block diagram illustration of an embodiment of the present invention.

FIG. 4 illustrates a system, process, or device according to an embodiment of the present invention. At 102, in response commencement of meeting that has a primary speaker or host and includes a plurality of other, different meeting participants (people) that are each equipped with (wear) headphones according to the present invention, a processor that is configured according to the present invention (the "configured processor") forms a communication link between a source of audio signals provided by the meeting host and the headphones of each of the other meeting participants, wherein audio signal from the host provides a primary source of audio data broadcast to the meeting participants through their headphones. The host audio signal may be from a microphone used by the host; the host audio signals may also be projected toward the headphones through speaking, or through a public address speaker system broadcasting into the room, and received by a microphone device of the headphones, wherein the host audio data is distinguished from other audio signals and sounds projected toward or otherwise received by the headphones.

The participant headphones include said speakers, a microphone configured to capture spoken audio data generated by the participant wearing the headphone, and voice or noise isolation components.

Thus, upon commencement of the meeting at 102 any other audio data provided to the meeting participants through their headphones, such as speech audio from the other meeting participants headphone microphones, or projected toward the participants by speaking generally into the room or environment of the other participants, is secondary audio data that is presented at a lower volume level to the participants, or is muted using noise or voice isolation components built-in to the headphones, relative to the host audio signal data, so that each of the meeting participants may clearly hear and give primary attention to the host audio data.

The headphones further include, or are in circuit communication with a compass component or direction service that is configured to determine a rotational orientation of the headphones on the participant, relative to their current location (for example, seat, upper torso, head, etc.); and a camera that is incorporated within (internal to) the headphones, or is external to the headphone, wherein the camera is oriented to capture image data that is determinative of a viewpoint or focus of the gaze of the wearer of the headphones.

At 104, in response determining that one (a first) of the meeting participants is initiating a side, secondary or cross-talk discussion with another of the meeting participants that is not the host, the configured processor determines from orientation data obtained from the compass of the first participant headphone a direction of gaze of the first participant. The determination that the first participant is initiating a side discussion may be based on variety of inputs, such as speech audio (or signal words or phrasing provided therein) input to the microphone of the first participant, or a graphic user interface (GUI) input to a designated icon or command prompt to touch screen of a smart phone of the first participant, etc.

At 106 the configured processor determines which one of the other meeting participants that the determined gaze of the first participant is (most likely) focused upon from (as function of) image data from the camera of (or associated to) the first participant headphone.

At 108 the configured processor selects this most-likely focused-upon participant (determined at 106) as the second participant for establishing a side or cross-talk discussion between the first and the second participants.

At 110 the configured processor initiates (or requests establishment of) a cross-talk discussion link between the headphones of the first and second participants, wherein audio from their headphone microphones becomes a primary source of audio data broadcast to each of their respective headphone speakers (audio from the headphone microphone of the first participant becomes the primary source of audio data broadcast to the headphone speakers of the second participant, and audio from the headphone microphone of the second participant becomes the primary source of audio data broadcast to the headphone speakers of the first participant); and other audio data, such as that broadcast or provided to the headphones of the first and second meeting participants from the host, or other participants, or other ambient or projected sound received by the headphones, is treated as secondary audio data that is presented at a lower volume level, or is muted, or is masked or cancelled-out using noise or voice isolation or cancellation components built-in to or associated to the headphones, relative to the primary, cross-talk audio generated from the microphones of the headphones of the first and second participants.

To reduce confusion examples of side conversations are generally discussed herein with respect to a minimum conversation size of two (first and second) participants. However, it will be understood that each established side conversation may include additional participants, (for example, a third participant, a fourth, etc.), wherein the first or second participant may utilize the process of FIG. 4 to add additional participants to any given side conversation.

Thus, in response to initiating the side conversation at 110 the first and second (or more) meeting participants may now clearly hear and talk to each other and give primary attention to each other during a duration of the established side conversation, with minimal competition or interruption from the host or other speakers, sounds, etc.

Embodiments use a combination of directional orientation and focus data provided by compass and camera components of the participant headphones to pair discrete groupings of headphones between meeting participants to establish and engage in voice communications in side, cross-talk conversations that do not interfere with the ability of other participants to focus on the primary, host speaker presentation, or to engage in their own, discrete side conversations: the noise or voice isolation components of the headphones of each participant prevent unwanted interference with their own, primary audio feeds or sources. Thus, for another (third) participant for which the primary audio signal data is from the speaker, or from another (fourth) participant in another side conversation with the third participant, embodiments deployed within the headphones of the third participant treat the cross-talk audio signals generated by the first and second participants in their side conversation as secondary audio (at a lower level, muted, masked, etc.), so that the audio data generated by the first and second participants in their side conversation do not disturb or otherwise interfere with the ability of the third participant to hear the other, primary audio signal presented to the third participant.

Embodiments establish cross-talk, side conversations via the process of system of FIG. 4 during video conference as well as in-person meetings. Thus, a second (or other, additional) participant may be identified via the combination of directional orientation and focus data provided by compass and camera components of the first participant headphones in response to the first participant looking at and focusing on an image of the second participant that is presented within a video screen display, wherein the position of the second participant within the video screen is distinct from the positions of the images of the host and the other participants. Thus, the camera providing the image gaze data may be an external camera installed in a video conference display device, wherein said external camera data is processed by the configured processor to identify a participating user's focus direction on the display device at a granularity that is capable of distinguishing which particular participant of a plurality of participants displayed in the video conference display that the first participant is focused upon, in order to identify the position of that person as the second participant.

Figure 5:
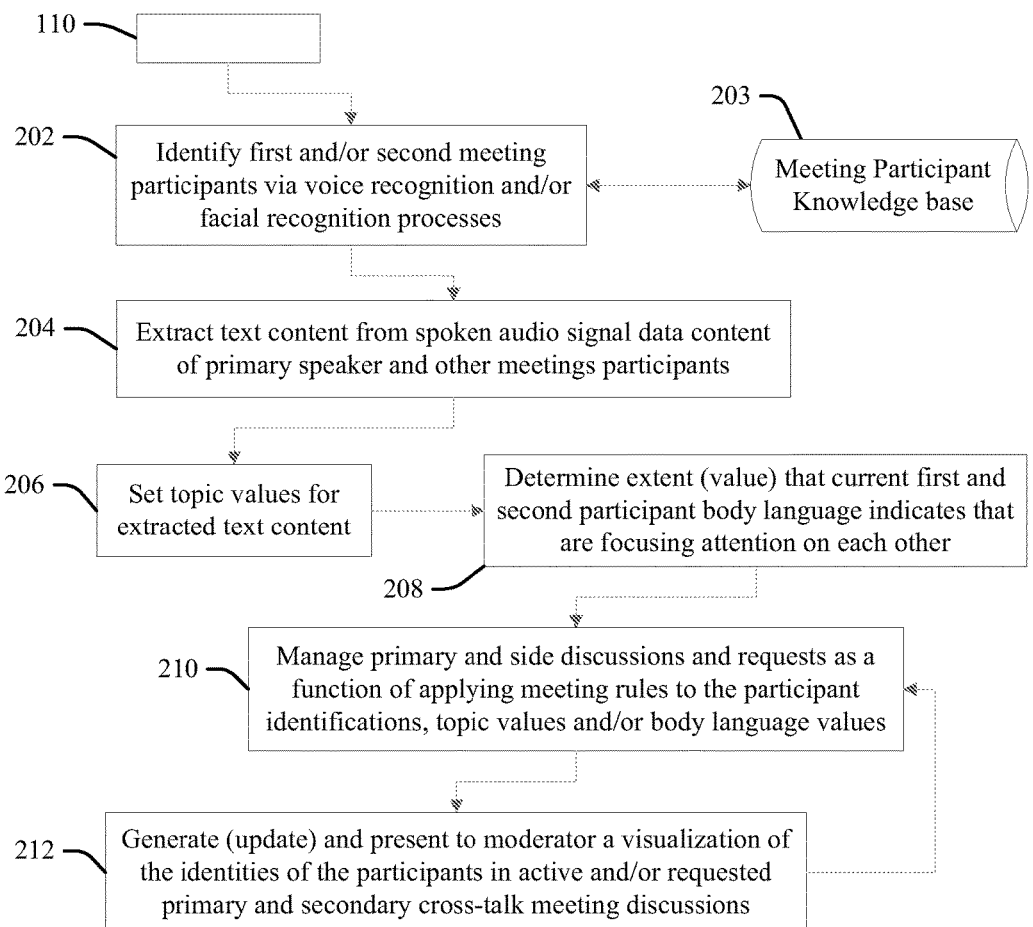
FIG. 5 is a block diagram illustration of another embodiment of the present invention.

FIG. 5 illustrates another embodiment of the present invention. In response to a request at 110 to establish a cross-talk discussion link between the headphones of the first and second participants (as described above with respect to FIG. 4), at 202 a processor configured according to an embodiment of the present invention (the "configured processor") identifies one or both of the first and second meeting participants via self-identification (for example, entering a username into an application executing the process described herein), or via voice recognition and/or facial recognition processes. For example, at 202 the configured processor matches voice pattern data acquired by headphone microphones, or facial image data acquired from the cameras of or associated to the headphones, to voice pattern or facial image data sets that are labeled with specific identities within a Meeting Participant Knowledge Base 203 of identified individuals that has identification indicia for use by the configured processor in matching to the data and/or attributes determined for the first and second participants.

The Meeting Participant Knowledge Base 203 may be closed or limited data set, such as a corpus of employees of a single employer, team members of a department invited to the meeting, or school teachers, professors, students and or staff, or other organization or specific social network members, etc. The Meeting Participant Knowledge Base 203 may also include more comprehensive public domain data that is limited in scope only by the amount of data for different individuals that is available.

At 204 the configured processor utilizes speech-to-text processes to generate (extract) text content from audio signal data that includes spoken content of the primary speaker and the other meetings participants, and at 206 applies Natural Language Processing (NLP) and/or other text content and contextual analysis to set (determine) topic values for the extracted text content. For example, the configured processor sets a first topic value in response to determining that spoken content of the first or second participant is on-topic (related directly to the primary speaker content), and sets a second topic value that is lower than the first topic value in response to determining that the spoken content of the first or second participant is off-topic (not related directly to the primary speaker content).

At 208 the configured processor analyzes video image data of the first and second participants to determine (set) a degree or value that their current body language indicates that they are focusing their attention on each other, which is inherently indicative of their intention to engage in a side conversation. For example, the configured processor sets a first body language degree/value in response to determining that both of the first and second participants have currently aligned their upper torsos to face each other (for example, in proportion to a degree of alignment of a torso of the first participant to an orientation facing the second participant), and sets a second body language degree/value that is lower than the first body language degree/value in response to determining that either of the first and the second participants have not currently aligned his or her upper torso to face the other.

At 210 the configured processor manages (allows, enables, cancels, terminates, blocks, etc.) current, active and/or requested primary and secondary cross-talk discussions (including the request at 110 to establish the cross-talk discussion link between the headphones of the first and second participants) as a function of applying meeting rules to the (requested) discussions as a function of one or more of the identifications determined for the participants therein at 202, the topic values set for the extracted text content at 206, and the body language values set at 208.

Embodiments apply topic-driven rules in managing conversations at 210: for example, for a meeting at work, terminating side conversations, or reducing their allowed duration, in response to determining topics discussed therein are not work-related. Management at 210 may also be dynamically responsive to determining if topics or contexts of primary or side discussions have changed, including in response to determining that a cross-talk side conversation becomes less allowable due to change in the extracted text content from comprising items that match primary topic subject matter, to content that fails to match the primary topic subject matter. For example, for a primary meeting topic of "Working Group on programming solutions for new customer interface," an embodiment terminates a side conversation at 210 in response to determining that matching extracted content terms and phrases "Hadoop" "object-oriented solution" and "chatbot application" initially present in the extracted content have diminished in frequency below a specified occurrence rate threshold, or are no longer present, and/or wherein current extracted content of items of "lunch," "burritos," "taco salad" do not match the primary meeting topic, or matches to non-work related, "lunch" subject matter. In another example, managing conversations dynamically at 210 may be a function of applying stricter requirements, such as due to determining at 206 a shift to a continuing education topic discussion in the primary content from a general business news update topic that was associated with a more-permissive rule.

Embodiments at 210 also grant, or deny the request (at 110), and blocks creation of a cross-talk session between the first and second participants as a function of determining whether the persons identified (at 202) as the first and second participants have permission to engage in a side conversation. In one example, permission is determined at 210 as a function of determining whether participants with their job titles or task descriptions are allowed to engage in a side conversation for this meeting, including as a function of meeting topic: thus, the configured processor denies/blocks the side conversation request at 110 in response to determining that the topic is a continuing education presentation, wherein applicable rules require primary attention to the host throughout the duration of the meeting; and allows or grants the requested side conversation in response to determining that the meeting topic is "lunch menu revisions" or some other general information topic that does not require continual attention under applicable rules for the job titles of the participants.

Management at 210 may be based on time rules, for example, closing (or requesting via messaging notification that participants manually close) a cross-talk after elapse of a default or specified time duration (for example, 15 seconds, one minute, etc.), and requiring the identified participants to rejoin the primary meeting settings; and further, wherein they may be allowed to or prevented from initiating subsequent, additional side conversations as a function of time or frequency thresholds (for example, they may not exceed two minutes in total, aggregate side conversation time, or engage in more than three side conversations in one meeting, etc.)

At 212 the configured processor generates and presents to a supervisory entity (moderator, host, etc.) a visualization or report that displays the identities determined at 202 of each of the participants in current, active and/or requested primary and secondary cross-talk discussions. The visualization enables the supervisory entity to readily see or identify the participants or primary and secondary cross talk conversations, such as on a computer monitor or smart phone display device that labels the different conversations and participants, and provides current elapsed time of each, or indicated which participant is generated speech audio in each conversation, including for total time amounts relative to the other participants.

In the present example, the visualization at 212 enables a supervisory entity to directly manage the primary and cross talk sessions, by providing feedback to the process at 210, such as revising or providing additional rules or inputs for use in defining and scheduling and executing meetings, to define if and when secondary cross talk sessions are permitted or forbidden, define authorized participants for any given side meeting, and otherwise to manage the meeting. Thus, in response to said feedback, management at 210 may revised the permitted or active side conversations, resulting in an update to the visualization at 212.

Embodiments of the present invention provide advantages and added value relative to prior art systems and solutions. Existing solutions to allow for creation of separate, secondary lines of communications for side conversations during a primary teleconference presentation may generate cross-talk that is audible to other meeting participants, making it difficult for them to concentrate upon or even clearly hear the primary speaker or presentation subject matter. However, there may be a need for allowing and enabling such separate, side conversations, so a participant may acquire an explanation from another participant as to subject matter conveyed in the primary presentation without interrupting the presentation, or to enable a quick breakout-sessions of several participants so that they can interact and efficiently accomplish a work task without impacting the primary speaker or other side conversations during the meeting.

Embodiments prevent disturbances from cross talk audio generated by secondary conversations of meeting, while enabling participants to realize the benefits of engaging in separate threads of communication that are broken out into isolated conversations, and seamlessly rejoin primary meeting when complete (wherein their headphone devices dynamically switch their internal audio broadcasts of side conversations back to the primary, host audio).

Embodiments create separate side conversations through use of specialized headphone components that prevent interference with the ability of other participants to pay attention to or clearly hear the primary presentation, or their own side conversations, including during in-person meetings (via the use of noise-cancelling and personal microphone features.

Embodiments initiate secondary cross-talk conversations dynamically, based on identifying as function of real-time facial orientation (gaze) and compass direction data acquired by the headphone components, while enabling supervisors (hosts, moderators, authorized users, etc.) to monitor active or requested primary and cross talk sessions (via the visualization report aspects described above), and thereby dynamically manage the conversations, for example, to close out or deny problematic side conversation formations that exceed allowable interruption times to attention given to the primary speaker, or other rules used to manage the conference. Thus, embodiments manage the primary and secondary cross talk sessions of meeting participants of in-person meeting or video conference meetings via managing dynamic cross talk secondary discussions based on context to prevent the interruption of primary meeting discussions.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising executing on a computer processor:
   in response to commencing a meeting, selecting audio signals provided by the host of the meeting as a primary source of audio data broadcast to a first participant of the meeting through a speaker of a first set of participant headphones that are worn by the first participant;
   determining a direction of gaze of the first meeting participant as a function of orientation data of the first participant headphones;
   initiating a side conversation between the first participant and a second participant of the meeting in response to determining that the second participant is located within the determined direction of gaze of the first participant and that attention of the first participant is focused upon the second participant; and
   in response to initiating the side conversation, setting audio signals provided by the second participant of the meeting as the primary source of audio data broadcast to the first participant of the meeting through the speaker of the first set of participant headphones.

2. The method of claim 1, further comprising:
   in response to the initiating the side conversation, presenting the audio signals provided by the host as a secondary audio data signal to the first participant through the speaker of the first set of participant headphones that are worn by the first participant; and
   wherein presenting audio signals as the secondary audio data signal is selected from the group consisting of presenting audio signals from the host at a lower volume level relative to a volume level of presenting the primary source audio signals, muting the audio signals from the host, and masking the audio signals from the host via a noise cancellation component.

3. The method of claim 2, further comprising:
   in response to presenting another audio signal as a primary source of audio data broadcast to a third participant of the meeting through a speaker of a third set of participant headphones that are worn by the third participant, presenting the audio signals provided by the second participant as a secondary audio data signal to the third participant through the speaker of the third set of participant headphones.

4. The method of claim 1, further comprising:
determining an identity of the first participant via an identification process that is selected from the group consisting of self-identification, a voice recognition process that is applied to audio data generated by the first participant, and a facial recognition process that is applied to image data of the first participant; and
determining whether to block the initiated side conversation between the first participant and the second participant as a function of applying a meeting rule to the determined identity of the first participant.

5. The method of claim 4, further comprising:
extracting text content from audio data generated by the first participant;
determining a topic value for the extracted text content as a function of a strength of the match to a meeting topic; and
determining whether to block the initiated side conversation between the first participant and the second participant as a function of applying the meeting rule to the determined topic value.

6. The method of claim 4, further comprising:
determining a body language value in proportion to a degree of alignment of the first participant to an orientation facing the second participant; and
determining whether to block the initiated side conversation between the first participant and the second participant as a function of applying the meeting rule to the determined body language value.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the selecting the audio signals provided by the host as the primary source of audio data broadcast to the first participant in response to the commencing the meeting, the determining the direction of gaze of the first meeting participant, the initiating the side conversation between the first participant and the second participant, and the setting the audio signals provided by the second participant of the meeting as the primary source of audio data broadcast to the first participant in response to the initiating the side conversation.

8. The method of claim 7, wherein the computer-readable program code is provided as a service in a cloud environment.

9. A computer system, comprising:
a computer processor;
a computer readable memory in circuit communication with the computer processor; and
a computer readable storage medium in circuit communication with the computer processor;
wherein the computer processor executes program instructions stored on the computer readable storage medium via the computer readable memory and thereby:
in response to commencement of a meeting, selects audio signals provided by the host of the meeting as a primary source of audio data broadcast to a first participant of the meeting through a speaker of a first set of participant headphones that are worn by the first participant;
determines a direction of gaze of the first meeting participant as a function of orientation data of the first participant headphones;
initiates a side conversation between the first participant and a second participant of the meeting in response to determining that the second participant is located within the determined direction of gaze of the first participant and that attention of the first participant is focused upon the second participant; and
in response to initiating the side conversation, sets audio signals provided by the second participant of the meeting as the primary source of audio data broadcast to the first participant through the speaker of the first set of participant headphones.

10. The system of claim 9, wherein the processor executes program instructions stored on the computer readable storage medium via the computer readable memory and thereby:
in response to the initiating the side conversation, presents the audio signals provided by the host as a secondary audio data signal to the first participant through the speaker of the first set of participant headphones; and
presents audio signals as the secondary audio data signal in a process that is selected from the group consisting of presenting audio signals from the host at a lower volume level relative to a volume level of presenting the primary source audio signals, muting the audio signals from the host, and masking the audio signals from the host via a noise cancellation component.

11. The system of claim 10, wherein the processor executes program instructions stored on the computer readable storage medium via the computer readable memory and thereby:
in response to presenting another audio signal as a primary source of audio data broadcast to a third participant of the meeting through a speaker of a third set of participant headphones that are worn by the third participant, presents the audio signals provided by the second participant as a secondary audio data signal to the third participant through the speaker of the third set of participant headphones.

12. The system of claim 9, wherein the processor executes program instructions stored on the computer readable storage medium via the computer readable memory and thereby:
determines an identity of the first participant via an identification process that is selected from the group consisting of self-identification, a voice recognition process that is applied to audio data generated by the first participant, and a facial recognition process that is applied to image data of the first participant; and
determines whether to block the initiated side conversation between the first participant and the second participant as a function of applying a meeting rule to the determined identity of the first participant.

13. The system of claim 12, wherein the processor executes program instructions stored on the computer readable storage medium via the computer readable memory and thereby:
extracts text content from audio data generated by the first participant;
determines a topic value for the extracted text content as a function of a strength of the match to a meeting topic; and determines whether to block the initiated side conversation between the first participant and the second participant as a function of applying the meeting rule to the determined topic value.

14. The system of claim 12, wherein the processor executes program instructions stored on the computer readable storage medium via the computer readable memory and thereby:
determines a body language value in proportion to a degree of alignment of the first participant to an orientation facing the second participant; and
determines whether to block the initiated side conversation between the first participant and the second participant as a function of applying the meeting rule to the determined body language value.

15. A computer program product, comprising:
a computer readable storage medium having computer readable program code embodied therewith, the computer readable program code comprising instructions for execution by a computer processor that causes the computer processor to:
in response to commencement of a meeting, select audio signals provided by the host of the meeting as a primary source of audio data broadcast to a first participant of the meeting through a speaker of a first set of participant headphones that are worn by the first participant;
determine a direction of gaze of the first meeting participant as a function of orientation data of the first participant headphones;
initiate a side conversation between the first participant and a second participant of the meeting in response to determining that the second participant is located within the determined direction of gaze of the first participant and that attention of the first participant is focused upon the second participant; and
in response to initiating the side conversation, set audio signals provided by the second participant of the meeting as the primary source of audio data broadcast to the first participant through the speaker of the first set of participant headphones.

16. The computer program product of claim 15, wherein the instructions for execution cause the computer processor to:
in response to the initiating the side conversation, present the audio signals provided by the host as a secondary audio data signal to the first participant through the speaker of the first set of participant headphones; and
present audio signals as the secondary audio data signal in a process that is selected from the group consisting of presenting audio signals from the host at a lower volume level relative to a volume level of presenting the primary source audio signals, muting the audio signals from the host, and masking the audio signals from the host via a noise cancellation component.

17. The computer program product of claim 16, wherein the instructions for execution cause the computer processor to:
in response to presenting another audio signal as a primary source of audio data broadcast to a third participant of the meeting through a speaker of a third set of participant headphones that are worn by the third participant, present the audio signals provided by the second participant as a secondary audio data signal to the third participant through the speaker of the third set of participant headphones.

18. The computer program product of claim 15, wherein the instructions for execution cause the computer processor to:
determine an identity of the first participant via an identification process that is selected from the group consisting of self-identification, a voice recognition process that is applied to audio data generated by the first participant, and a facial recognition process that is applied to image data of the first participant; and
determine whether to block the initiated side conversation between the first participant and the second participant as a function of applying a meeting rule to the determined identity of the first participant.

19. The computer program product of claim 18, wherein the instructions for execution cause the computer processor to:
extract text content from audio data generated by the first participant;
determine a topic value for the extracted text content as a function of a strength of the match to a meeting topic; and
determine whether to block the initiated side conversation between the first participant and the second participant as a function of applying the meeting rule to the determined topic value.

20. The computer program product of claim 18, wherein the instructions for execution cause the computer processor to:
determine a body language value in proportion to a degree of alignment of the first participant to an orientation facing the second participant; and
determine whether to block the initiated side conversation between the first participant and the second participant as a function of applying the meeting rule to the determined body language value.

* * * * *